United States Patent [19]
Sato et al.

[11] Patent Number: 6,156,684
[45] Date of Patent: Dec. 5, 2000

[54] LIGHT POLARIZATION CONTROL ELEMENT USING STRESS-OPTICAL COEFFICIENT GLASS AND METHOD OF PRODUCING THE STRESS-OPTICAL COEFFICIENT GLASS

[75] Inventors: Kouichi Sato, Hoya; Kazuo Tachiwana, Hamura, both of Japan

[73] Assignee: Hoya Corporation, Japan

[21] Appl. No.: 09/097,743

[22] Filed: Jun. 16, 1998

[30] Foreign Application Priority Data

Jun. 17, 1997 [JP] Japan .................................... 9-176506
Mar. 27, 1998 [JP] Japan .................................. 10-100101

[51] Int. Cl.⁷ .............................. C03C 3/16; C03C 3/17; C03C 3/19; C03C 3/21; C03C 4/00
[52] U.S. Cl. ................................ 501/45; 501/46; 501/47; 501/48; 501/13; 501/901; 359/483
[58] Field of Search ................................. 501/45, 46, 47, 501/48, 900, 903, 901, 13; 359/483, 485

[56] References Cited

U.S. PATENT DOCUMENTS

| | | | |
|---|---|---|---|
| 3,485,646 | 12/1969 | Junge | 501/45 |
| 3,585,057 | 6/1971 | Jahn | 501/45 |
| 3,798,041 | 3/1974 | Izumitani et al. | 501/45 |
| 3,964,919 | 6/1976 | Ray et al. | 501/45 |
| 3,979,322 | 9/1976 | Alexeev et al. | 501/45 |
| 4,076,647 | 2/1978 | Faulstich et al. | 501/45 |
| 4,108,673 | 8/1978 | Toratani et al. | 501/45 |
| 4,110,245 | 8/1978 | Yamashita | 501/46 |
| 4,115,131 | 9/1978 | Ishibashi et al. | 501/46 |
| 4,261,751 | 4/1981 | Nakamura et al. | 501/901 |
| 4,433,062 | 2/1984 | Courbin et al. | 501/901 |
| 4,439,529 | 3/1984 | Joormann et al. | 501/45 |
| 4,439,530 | 3/1984 | Tajima | 501/45 |

FOREIGN PATENT DOCUMENTS

| | | |
|---|---|---|
| 50-71708 | 6/1975 | Japan . |
| 2188442A | 7/1990 | Japan . |
| 09048633 | 2/1997 | Japan . |
| 9048631A | 2/1997 | Japan . |
| 9-176506 | 6/1997 | Japan . |
| 10-100101 | 3/1998 | Japan . |

OTHER PUBLICATIONS

Tashiro, Megumi, "The Effects of the Polarisation of the Constituent Ions on the Photoelastic Birefringence of the Glass," Journal of the Society of Glass Technology, pp. 352–362. No Date.

*Primary Examiner*—Michael Marcheschi
*Attorney, Agent, or Firm*—Cook, Alex, McFarron, Manzo, Cummings & Mehler, Ltd.

[57] ABSTRACT

In a light polarization control element using a stress-optical coefficient glass, the stress-optical coefficient glass is substantially composed of a phosphorous acid glass containing 20 to 60 percent by weight of $P_2O_5$ and 40 to 73 percent by weight of BaO and PbO.

31 Claims, 13 Drawing Sheets

TRANSISTOR

NUMBER OF PIXELS FOURFOLD

NUMBER OF PIXELS EIGHTFOLD

FIG. 3

| | Embodiments (wt%) | | | | | | | | |
|---|---|---|---|---|---|---|---|---|---|
| | 1 | 2 | 3 | 4 | 5 | 6 | 7 | 8 | 9 |
| $P_2O_5$ | 43.0 | 43.0 | 56.0 | 43.0 | 50.0 | 48.0 | 46.0 | 53.0 | 53.0 |
| BaO | 55.0 | 52.0 | 43.0 | 55.5 | 45.0 | 44.0 | 48.0 | 45.0 | 35.0 |
| PbO | | | | | | | | | |
| $Nb_2O_5$ | | | | 1.5 | | | | | |
| $WO_3$ | | 3.0 | | | | | | | |
| $K_2O$ | | | | | | 1.0 | | | |
| $Na_2O$ | | | | | | 1.0 | | | |
| $Li_2O$ | | | | | | 0.5 | | | |
| $Sb_2O_3$ | | | | | | | | | |
| ZnO | | | | | 3.0 | | | | |
| $TiO_2$ | | | | | | 1.5 | | | |
| $Al_2O_3$ | | | | | 2.0 | | | | |
| SrO | | | | | | 4.0 | | 2.0 | 1.0 |
| CaO | | | | | | | 3.0 | | |
| MgO | | | | | | | 2.0 | | |
| $B_2O_3$ | 2.0 | 2.0 | | | | | 1.0 | | |
| $Cs_2O$ | | | | | | | | | |
| $BaF_2$ | | | | | | | | | 10.0 |
| $AlF_3$ | | | | | | | | | 1.0 |
| $La_2O_3$ | | | 1.0 | | | | | | |
| Refractive index (nd) | 1.592 | 1.603 | 1.623 | 1.605 | 1.673 | 1.703 | 1.663 | 1.592 | 1.589 |
| stress-optical coefficient ($\times 10^{-12}$Pa) | 0.41 | 0.39 | 0.65 | 0.38 | 0.65 | 0.61 | 0.71 | 0.72 | 0.77 |
| L.T (°C) | 880 | 860 | 840 | 850 | 830 | 850 | 860 | 850 | 890 |
| T400nm(%) | 88 | 85 | 84 | 80 | 85 | 73 | 82 | 85 | 87 |

FIG. 4

|  | Embodiments (wt%) | | | | | | | |
|---|---|---|---|---|---|---|---|---|
|  | 10 | 11 | 12 | 13 | 14 | 15 | 16 | 17 |
| $P_2O_5$ | 35.0 | 50.0 | 35.0 | 40.0 | 35.0 | 38.0 | 38.0 | 38.0 |
| BaO | 40.0 | 22.0 | 12.0 | 25.0 | 38.0 | 15.5 | 16.0 | 16.0 |
| PbO | 25.0 | 27.0 | 45.0 | 30.0 | 25.0 | 43.0 | 43.0 | 43.0 |
| $Nb_2O_5$ |  |  |  | 1.0 |  |  |  |  |
| $WO_3$ |  |  |  |  |  |  |  |  |
| $K_2O$ |  |  |  |  |  |  |  | 1.0 |
| $Na_2O$ |  |  |  |  |  |  | 1.0 |  |
| $Li_2O$ |  |  |  |  |  | 0.5 |  |  |
| $Sb_2O_3$ |  |  | 0.2 |  |  |  |  |  |
| ZnO |  |  | 2.8 |  |  |  |  |  |
| $TiO_2$ |  |  |  |  |  | 2.0 |  |  |
| $Al_2O_3$ |  | 1.0 |  |  |  |  |  |  |
| SrO |  |  | 4.0 |  |  |  |  |  |
| CaO |  |  |  | 4.0 |  |  |  |  |
| MgO |  |  |  |  | 2.0 |  |  |  |
| $B_2O_3$ |  |  | 1.0 |  |  |  | 2.0 | 2.0 |
| $Cs_2O$ |  |  |  |  |  | 1.0 |  |  |
| $BaF_2$ |  |  |  |  |  |  |  |  |
| $AlF_3$ |  |  |  |  |  |  |  |  |
| $La_2O_3$ |  |  |  |  |  |  |  |  |
| Refractive index (nd) | 1.665 | 1.623 | 1.704 | 1.654 | 1.660 | 1.656 | 1.642 | 1.641 |
| stress-optical coefficient ($\times 10^{-12}$Pa) | * −0.25 | 0.43 | 0.15 | 0.21 | 0.03 | 0.12 | 0.19 | 0.10 |
| L.T (°C) | 740 | 760 | Not recognized | Not recognized | 750 | 800 | 710 | 700 |
| T400nm(%) | 83 | 85 | 81 | 78 | 81 | 71 | 82 | 82 |

[* : minus]

FIG. 5

| | Comparative examples (wt%) | | | | |
|---|---|---|---|---|---|
| | 1 | 2 | 3 | 4 | 5 |
| $P_2O_5$ | 48.0 | 34.0 | 30.0 | 35.0 | 53.0 |
| BaO | 20.0 | 48.0 | 3.0 | 30.0 | 20.0 |
| PbO | | | 60.0 | 25.0 | |
| $Nb_2O_5$ | | | 2.0 | 10.0 | |
| $WO_3$ | | | | | |
| $K_2O$ | | | | | |
| $Na_2O$ | | | | | |
| $Li_2O$ | | | | | |
| $Sb_2O_3$ | | | | | |
| ZnO | | | | | |
| $SiO_2$ | | | | | |
| $TiO_2$ | | | | | |
| $Al_2O_3$ | | 6.0 | 1.0 | | 2.0 |
| SrO | | | | | |
| CaO | 22.0 | | | | |
| MgO | | 3.0 | | | |
| $B_2O_3$ | 10.0 | | 4.0 | | |
| $Cs_2O$ | | | | | |
| F | | 9.0 | | | |
| $BaF_2$ | | | | | 25.0 |
| $AlF_3$ | | | | | |
| $La_2O_3$ | | | | | |
| F (anionic%) | | | | | 12.2 |
| Refractive index (nd) | 1.586 | 1.590 | 1.774 | 1.710 | 1.583 |
| stress-optical coefficient ($\times 10^{-12}$Pa) | 1.31 | 0.32 | 0.11 | 0.92 | 0.85 |
| L.T (°C) | 900 | 1010 | 900 | 750 | 950 |
| T400nm (%) | 88 | 90 | 65 | 63 | 89 |

FIG. 6

| | intrinsic stress-optical coefficient value | Embodiments (mol %) | | | | | | | | |
|---|---|---|---|---|---|---|---|---|---|---|
| | | 1 | 2 | 3 | 4 | 5 | 6 | 7 | 8 | 9 |
| $P_2O_5$ | 0.029 | 43.8 | 44.3 | 58.1 | 45.2 | 50.2 | 46.6 | 42.9 | 54.4 | 54.9 |
| BaO | -0.021 * | 52.0 | 49.6 | 41.4 | 54.0 | 41.8 | 39.5 | 41.5 | 42.7 | 33.6 |
| PbO | -0.036 * | | | | | | | | | |
| $Nb_2O_5$ | 0.11 | | | | 0.8 | | | | | |
| $WO_3$ | 0.06 | | 1.9 | | | | | | | |
| $K_2O$ | 0.03 | | | | | | 1.5 | | | |
| $Na_2O$ | 0.025 | | | | | | 2.2 | | | |
| $Li_2O$ | 0.015 | | | | | | 2.3 | | | |
| $Sb_2O_3$ | 0.04 | | | | | | | | | |
| ZnO | 0.037 | | | | | 5.2 | | | | |
| $TiO_2$ | 0.03 | | | | | | 2.6 | | | |
| $Al_2O_3$ | 0.01 | | | | | 2.8 | | | 2.9 | 1.4 |
| SrO | 0.008 | | | | | | 5.3 | | | |
| CaO | 0.016 | | | | | | | 7.1 | | |
| MgO | 0.04 | | | | | | | 6.6 | | |
| $B_2O_3$ | 0.05 | 4.2 | 4.2 | | | | | 1.9 | | |
| $Cs_2O$ | 0.03 | | | | | | | | | |
| $BaF_2$ | -0.018 * | | | | | | | | | 8.4 |
| $AlF_3$ | 0.03 | | | | | | | | | 1.7 |
| $La_2O_3$ | 0.035 | | | 0.5 | | | | | | |
| F(anionic %) | | | | | | | | | | 6.6 |
| Stress-optical coefficient: actual measured value ($\times 10^{-12}$Pa) | | 0.41 | 0.39 | 0.65 | 0.38 | 0.65 | 0.61 | 0.71 | 0.72 | 0.77 |
| Stress-optical coefficient: calculated value ($\times 10^{-12}$Pa) | | 0.39 | 0.55 | 0.83 | 0.26 | 0.80 | 0.78 | 0.85 | 0.71 | 0.80 |

[* : minus]

FIG. 7

| | intrinsic stress-optical coefficient value | Embodiments (mol %) | | | | | | | |
|---|---|---|---|---|---|---|---|---|---|
| | | 10 | 11 | 12 | 13 | 14 | 15 | 16 | 17 |
| $P_2O_5$ | 0.029 | 39.8 | 56.2 | 40.1 | 43.1 | 37.6 | 44.1 | 43.9 | 44.3 |
| BaO | -0.021 * | 42.1 | 22.9 | 12.8 | 24.9 | 37.8 | 16.7 | 17.1 | 17.3 |
| PbO | -0.036 * | 18.1 | 19.3 | 32.8 | 20.5 | 17.1 | 31.7 | 31.6 | 31.9 |
| $Nb_2O_5$ | 0.11 | | | | 0.6 | | | | |
| $WO_3$ | 0.06 | | | | | | | | |
| $K_2O$ | 0.03 | | | | | | | | 1.7 |
| $Na_2O$ | 0.025 | | | | | | | 2.7 | |
| $Li_2O$ | 0.015 | | | | | | 2.8 | | |
| $Sb_2O_3$ | 0.04 | | | 0.1 | | | | | |
| ZnO | 0.037 | | | 5.6 | | | | | |
| $TiO_2$ | 0.03 | | | | | | 4.1 | | |
| $Al_2O_3$ | 0.01 | | 1.6 | | | | | | |
| SrO | 0.008 | | | | 6.3 | | | | |
| CaO | 0.016 | | | | 10.9 | | | | |
| MgO | 0.04 | | | | | 7.5 | | | |
| $B_2O_3$ | 0.05 | | | 2.3 | | | | 4.7 | 4.8 |
| $Cs_2O$ | 0.03 | | | | | | 0.6 | | |
| $BaF_2$ | -0.018 * | | | | | | | | |
| $AlF_3$ | 0.03 | | | | | | | | |
| $La_2O_3$ | 0.035 | | | | | | | | |
| F(anionic %) | | | | | | | | | |
| Stress-optical coefficient: actual measured value $(\times 10^{-12}Pa)$ | | -0.25 * | 0.43 | 0.15 | 0.21 | 0.03 | 0.12 | 0.19 | 0.10 |
| Stress-optical coefficient: calculated value $(\times 10^{-12}Pa)$ | | -0.38 * | 0.46 | 0.09 | 0.23 | 0.02 | 0.08 | 0.12 | 0.06 |

[ * : minus]

FIG. 8

| | Comparative examples (wt%) | | | | | | | | |
|---|---|---|---|---|---|---|---|---|---|
| | 6 | 7 | 8 | 9 | 10 | 11 | 12 | 13 | 14 |
| $P_2O_5$ | 40.5 | 30.0 | | | | 20.0 | 46.0 | 33.8 | 37.0 |
| PbO | 59.5 | 70.0 | 75.0 | 66.0 | | 78.0 | 45.0 | 66.0 | 56.0 |
| $Nb_2O_5$ | | | | | | 2.0 | 2.0 | 0.2 | 7.0 |
| $SiO_2$ | | | 25.0 | 30.0 | 68.0 | | 7.0 | | |
| $K_2O$ | | | | 2.0 | 10.0 | | | | |
| $Na_2O$ | | | | 2.0 | 9.0 | | | | |
| $Li_2O$ | | | | | | | | | |
| $Sb_2O_3$ | | | | | | | | | |
| ZnO | | | | | | | | | |
| $TiO_2$ | | | | | | | | | |
| $Al_2O_3$ | | | | | | | | | |
| BaO | | | | | 1.0 | | | | |
| SrO | | | | | | | | | |
| CaO | | | | | | | | | |
| MgO | | | | | | | | | |
| $B_2O_3$ | | | | | 12.0 | | | | |
| F | | | | | | | | | |
| Dw(wt%) | 0.4 | 0.03 | 0.02 | 0.01 | 0.21 | | 0.6 | 0.03 | 0.02 |
| T400nm (%) | 84 | * | 69 | 76 | 87 | * | 84 | 80 | 68 |
| Stress-optical coefficient ($\times 10^{-12}$) | 0.06 | * | 0.04 | 1.11 | 2.82 | * | 1.35 | minus 0.1 | 0.5 |
| L.T (°C) | 660 | Dissolution, devitrification | Not recognized | Not recognized | Not recognized | Dissolution, devitrification | Not recognized | 780 | 700 |

[* : in comparative example 7, the transmittance, stress-optical coefficient and L.T were not measured because the devitrification happened while the dissolution was proceeding.]

FIG. 9

|  | Embodiments (wt%) | | | | | | | | | | |
|---|---|---|---|---|---|---|---|---|---|---|---|
|  | 20 | 21 | 22 | 23 | 24 | 25 | 26 | 27 | 28 | 29 | 30 |
| $P_2O_5$ | 26.0 | 37.0 | 39.0 | 35.0 | 37.0 | 37.0 | 37.0 | 34.0 | 36.0 | 36.0 | 34.0 |
| PbO | 69.0 | 54.0 | 54.0 | 54.0 | 54.0 | 54.0 | 54.0 | 59.0 | 58.0 | 58.0 | 59.0 |
| $Nb_2O_5$ | 3.7 | 1.0 | 1.0 | 1.0 | 3.0 | 3.0 | 3.0 | 1.0 | 3.0 | 3.0 | 1.0 |
| $SiO_2$ |  |  |  |  |  |  |  |  |  |  |  |
| $K_2O$ |  | 3.0 |  |  |  |  |  |  |  |  |  |
| $Na_2O$ |  |  |  |  |  |  |  |  |  | 3.0 |  |
| $Li_2O$ |  |  |  |  |  |  |  |  |  | 3.0 |  |
| $Sb_2O_3$ | 0.3 |  |  |  |  |  |  |  |  |  |  |
| ZnO |  | 5.0 |  |  |  |  |  |  |  |  |  |
| $TiO_2$ |  |  | 3.0 |  |  |  |  |  |  |  |  |
| $Al_2O_3$ |  |  | 3.0 |  |  |  |  |  |  |  |  |
| BaO |  |  |  | 10.0 |  |  |  |  |  |  |  |
| SrO |  |  |  |  | 6.0 |  |  |  |  |  |  |
| CaO |  |  |  |  |  | 6.0 |  |  |  |  |  |
| MgO |  |  |  |  |  |  | 6.0 |  |  |  |  |
| $B_2O_3$ |  |  |  |  |  |  |  | 6.0 |  |  | 6.0 |
| F |  |  |  |  |  |  |  |  |  |  | 20.0 |
| Dw(wt%) | 0.05 | 0.25 | 0.22 | 0.03 | 0.05 | 0.01 | 0.01 | 0.01 | 0.05 | 0.02 | 0.08 |
| T400nm (%) | 81 | 83 | 75 | 86 | 81 | 82 | 81 | 84 | 81 | 81 | 88 |
| stress-optical coefficient ($\times 10^{-12}$) | minus 1.35 ** | 0.81 | 0.74 | 0.48 | 0.76 | 0.79 | 0.81 | 0.60 | 0.65 | 0.60 | 0.58 |
| L.T(°C) | 650 | 640 | 640 | 650 | 620 | 630 | 610 | 640 | 600 | 600 | 620 |

| | Embodiments (wt%) | | | | | | | | | | | |
|---|---|---|---|---|---|---|---|---|---|---|---|---|
| | 31 | 32 | 33 | 34 | 35 | 36 | 37 | 38 | 39 | 40 | 41 | 42 |
| $P_2O_5$ | 40 | 35 | 33 | 29 | 33 | 39 | 28 | 37 | 39 | 35 | 37 | 37 |
| PbO | 53 | 59 | 57 | 59 | 61 | 25 | 68 | 54 | 54 | 54 | 54 | 54 |
| $Nb_2O_5$ | 1 | 1 | 3 | 3.5 | 2 | 1 | 3.7 | 2 | 1 | 1 | 3 | 3 |
| ZnO | 3 | 4 | | 5 | | | | | 5 | | | |
| BaO | 3 | | 5 | 2.5 | | | | | | 10 | | |
| $Al_2O_3$ | | 1 | | | | | | | 3 | | | |
| $La_2O_3$ | | | | | | | | | | | | |
| MgO | | | | | 0.3 | | | | | | | |
| CaO | | | | | 2 | | | | | | | 6 |
| SrO | | | | 1 | | | | | | | 6 | |
| $Li_2O$ | | | | | 0.3 | | | | | | | |
| $Na_2O$ | | | | | 0.3 | | | | | | | |
| $K_2O$ | | | | | 0.3 | | | 2 | | | | |
| $TiO_2$ | | | | | 0.6 | | | | | 3 | | |
| $Sb_2O_3$ | | | | | 0.2 | | 0.3 | | | | | |
| $B_2O_3$ | | | 2 | | | | | | | | | |
| $PbF_2$ | | | | | | 30 | | | | | | |
| $BaF_2$ | | | | | | 5 | | | | | | |
| | | | | | | | | | | | | |
| Total | 100 | 100 | 100 | 100 | 100 | 100 | 100 | 100 | 100 | 100 | 100 | 100 |
| Dw (wt%) | | | | | | | | | | | | |
| T400nm (%) | | | | | | | | | | | | |
| stress-optical coefficient ($\times 10^{-12}$) | 0.15 | 0.01 | -0.15 | 0.12 | -0.15 | 0.02 | -0.62 | 0.51 | 0.34 | -0.2 | 0.21 | 0.43 |
| L.T (°C) | | | | | | | | | | | | |
| nd | 1.712 | 1.732 | 1.741 | 1.796 | 1.792 | 1.705 | 1.821 | 1.742 | 1.776 | 1.786 | 1.748 | 1.751 |

FIG. 11

| | Embodiments (wt%) | | | | | | | | | | | |
|---|---|---|---|---|---|---|---|---|---|---|---|---|
| | 43 | 44 | 45 | 46 | 47 | 48 | 49 | 50 | 51 | 52 | 53 | 54 |
| $P_2O_5$ | 37 | 32 | 34 | 32 | 31 | 33 | 33 | 32 | 33 | 33 | 33 | 33 |
| PbO | 54 | 61 | 59 | 59 | 58 | 59 | 61 | 59 | 59 | 59 | 59 | 59 |
| $Nb_2O_5$ | 3 | 3 | 3 | 4 | 3 | 2 | 3 | 3 | 3 | 3 | 3 | 3 |
| ZnO | | 2 | 2 | 3 | 4 | 2 | 2 | 3 | 2 | 2 | 2 | 2 |
| BaO | | | | 2 | 4 | 4 | 1 | 2 | 1 | 1 | 1 | 1 |
| $Al_2O_3$ | | | | | | | | 1 | | | | |
| $La_2O_3$ | | | | | | | | | | 2 | | |
| MgO | 6 | | | | | | | | | 2 | | |
| CaO | | | | | | | | | | | 2 | |
| SrO | | | | | | | | | | | | 2 |
| $Li_2O$ | | | 2 | | | | | | | | | |
| $Na_2O$ | | 2 | | | | | | | | | | |
| $K_2O$ | | | | | | | | | | | | |
| $TiO_2$ | | | | | | | | | | | | |
| $Sb_2O_3$ | | | | | | | | | | | | |
| $B_2O_3$ | | | | | | | | | | | | |
| $PbF_2$ | | | | | | | | | | | | |
| $BaF_2$ | | | | | | | | | | | | |
| Total | 100 | 100 | 100 | 100 | 100 | 100 | 100 | 100 | 100 | 100 | 100 | 100 |
| Dw(wt%) | | | | 0.01 | 0.01 | 0.02 | 0.03 | 0.01 | 0.01 | 0.02 | 0.02 | 0.02 |
| T400nm (%) | | | | 81 | 82 | 84 | 82 | 82 | 82 | 82 | 82 | 82 |
| stress-optical coefficient ($\times 10^{-12}$) | 0.66 | 0.05 | 0.2 | 0.08 | 0.06 | -0.03 | -0.06 | -0.01 | -0.08 | 0.04 | 0.01 | -0.02 |
| L.T (°C) | | | | Not recognized | 640 | Not recognized | Not recognized | 680 | 670 | 640 | 630 | 620 |
| nd | 1.745 | 1.791 | 1.778 | 1.779 | 1.781 | 1.765 | 1.773 | 1.778 | 1.77 | 1.762 | 1.767 | 1.765 |

FIG. 12

Embodiments (mol %)

| | molecular intrinsic stress-optical coefficient value | 31 | 32 | 33 | 34 | 35 | 36 | 37 | 38 | 39 | 40 | 41 | 42 |
|---|---|---|---|---|---|---|---|---|---|---|---|---|---|
| $P_2O_5$ | 0.029 | 48.6 | 43 | 41.5 | 35.9 | 40 | 50.7 | 38.1 | 44 | 46.8 | 44.2 | 45.6 | 42 |
| PbO | -0.036 | 41 | 46 | 45.6 | 46.4 | 46.9 | 20.7 | 59 | 40.7 | 41.2 | 43.4 | 42.3 | 39 |
| $Nb_2O_5$ | 0.11 | 0.6 | 0.7 | 2 | 2.3 | 1.3 | 0.7 | 2.7 | 1.3 | 0.6 | 0.7 | 2 | 1.8 |
| ZnO | 0.037 | 6.4 | 8.6 | | 10.8 | | | | 10.4 | | | | |
| BaO | -0.021 | 3.4 | | 5.8 | 2.9 | | | | | | | | |
| $Al_2O_3$ | 0.01 | | 1.7 | | | | | | | 5 | | | |
| $La_2O_3$ | -0.01 | | | | | | | | | | 11.7 | | |
| MgO | 0.04 | | | | | 1.3 | | | | | | | |
| CaO | 0.016 | | | | | 6.1 | | | | | | | 17.2 |
| SrO | 0.008 | | | | 1.7 | | | | | | | | |
| $Li_2O$ | 0.015 | | | | | 1.7 | | | | | | | |
| $Na_2O$ | 0.025 | | | | | 0.8 | | | | | | | |
| $K_2O$ | 0.03 | | | | | 0.5 | | | 3.6 | | | | |
| $TiO_2$ | 0.03 | | | | | 1.3 | | | | | | | |
| $Sb_2O_3$ | 0.04 | | | | | 0.1 | | 0.2 | | | | | |
| $B_2O_3$ | 0.05 | | | 5.1 | | | | | | | | | |
| $PbF_2$ | -0.03 | | | | | | 22.6 | | | | | | |
| $BaF_2$ | -0.015 | | | | | | 5.3 | | | | | 10.1 | |
| $TeO_2$ | 0.05 | | | | | | | | | 6.4 | | | |
| Total | | 100 | 100 | 100 | 100 | 100 | 100 | 100 | 100 | 100 | 100 | 100 | 100 |
| stress-optical coefficient 1 ($\times 10^{-12}$) | | 0.15 | 0.01 | -0.15 | 0.12 | -0.15 | 0.02 | -0.62 | 0.51 | 0.34 | -0.2 | 0.21 | 0.43 |
| stress-optical coefficient 2 ($\times 10^{-12}$) | | 0.16 | 0.00 | -0.08 | -0.02 | -0.13 | 0.04 | -0.71 | 0.45 | 0.18 | -0.45 | 0.10 | 0.29 |
| L.T (°C) | | | | | | | | | | | | | |

The range of nd in $P_2O_5$ system: 1.69 to 1.84

FIG. 13

Embodiments (mol %)

| | molecular intrinsic stress-optical coefficient value | 43 | 44 | 45 | 46 | 47 | 48 | 49 | 50 | 51 | 52 | 53 | 54 |
|---|---|---|---|---|---|---|---|---|---|---|---|---|---|
| $P_2O_5$ | 0.029 | 40.6 | 39.8 | 39.5 | 40.6 | 38.7 | 41.9 | 42.4 | 40.2 | 42.6 | 39.5 | 40.4 | 41.6 |
| PbO | -0.036 | 38.4 | 48.2 | 43.5 | 47.7 | 46 | 47.6 | 49.9 | 47.1 | 48.5 | 44.9 | 46 | 47.3 |
| $Nb_2O_5$ | 0.11 | 1.8 | 2 | 1.9 | 2.7 | 2 | 1.4 | 2 | 2 | 2.1 | 1.9 | 2 | 2 |
| ZnO | 0.037 | | 4.3 | 4.1 | 6.6 | 8.7 | 4.4 | 4.5 | 6.6 | 4.5 | 4.2 | 4.3 | 4.4 |
| BaO | -0.021 | | | | 2.4 | 4.6 | 4.7 | 1.2 | 2.3 | 1.2 | 1.1 | 1.1 | 1.2 |
| $Al_2O_3$ | 0.01 | | | | | | | | 1.8 | | | | |
| $La_2O_3$ | -0.01 | | | | | | | | | 1.1 | | | |
| MgO | 0.04 | 19.2 | | | | | | | | | 8.4 | | |
| CaO | 0.016 | | | | | | | | | | | 6.2 | |
| SrO | 0.008 | | | | | | | | | | | | 3.5 |
| $Li_2O$ | 0.015 | | | 11 | | | | | | | | | |
| $Na_2O$ | 0.025 | | 5.7 | | | | | | | | | | |
| $K_2O$ | 0.03 | | | | | | | | | | | | |
| $TiO_2$ | 0.03 | | | | | | | | | | | | |
| $Sb_2O_3$ | 0.04 | | | | | | | | | | | | |
| $B_2O_3$ | 0.05 | | | | | | | | | | | | |
| $PbF_2$ | -0.03 | | | | | | | | | | | | |
| $BaF_2$ | -0.015 | | | | | | | | | | | | |
| $TeO_2$ | 0.05 | | | | | | | | | | | | |
| Total | | 100 | 100 | 100 | 100 | 100 | 100 | 100 | 100 | 100 | 100 | 100 | 100 |
| stress-optical coefficient 1 ($\times 10^{-12}$) | | 0.66 | 0.05 | 0.2 | 0.08 | 0.06 | -0.23 | -0.16 | -0.08 | -0.08 | 0.14 | 0.01 | -0.07 |
| stress-optical coefficient 2 ($\times 10^{-12}$) | | 0.76 | -0.06 | 0.11 | -0.05 | -0.09 | -0.28 | -0.21 | -0.10 | -0.15 | 0.21 | -0.03 | -0.11 |
| L.T (°C) | | | | | Not recognized | 640 | Not recognized | Not recognized | 680 | 670 | 640 | 630 | 620 |

The range of nd in $P_2O_5$ system: 1.69 to 1.84

LIGHT POLARIZATION CONTROL ELEMENT USING STRESS-OPTICAL COEFFICIENT GLASS AND METHOD OF PRODUCING THE STRESS-OPTICAL COEFFICIENT GLASS

REFERENCE OF RELATED APPLICATIONS

This application claims the priority right under 35 U.S.C. 119 of Japanese Patent Application No. Hei 9-176506 filed on Jun. 17, 1997 and Japanese Patent Application No. Hei 10-100101 filed on Mar. 27. 1998, the entire disclosures of which are incorporated by reference.

BACKGROUND OF THE INVENTION

1. Field of the Invention

The present invention relates to a light polarization control element using an stress-optical coefficient glass and a method for producing the stress-optical coefficient glass used for the light polarization control element.

2. Description of the Related Art

A low stress-optical coefficient glass is applied to, for example, a light polarization control element or the like. Such an element is exemplified by an optical element (optical parts) such as a substrate and prism body constituting a polarizing beam splitter or a space light modulating element for conducting a polarized light modulation.

In the low stress-optical coefficient glass, it is a necessary requirement that a birefringence, which is caused when an external mechanical force or thermal action is applied thereto, should be small. In other words, an stress-optical coefficient thereof should be low. Further it needs to satisfy the following requirements: it should have a predetermined refractive index and a low liquid phase temperature; it should be manufactured easily enough to be mass-produced; it should have a certain transmittance corresponding to a predetermined wavelength; and it should not cause any environmental pollution. As for the refractive index, the transmittance and the like among these requirements, the desired characteristics are varied according to their actual uses. For example, with respect to a polarizing beam splitter in a liquid crystal projector, it is preferable that the stress-optical coefficient falls into the range of +0.8×10$^{-12}$ Pa to −0.3×10$^{-12}$ Pa, and the refractive index is within 1.57 to 1.73.

In the liquid crystal projector, a birefringence (an stress-optical coefficient) becomes a problem for the following reasons.

In the case of a transmitter type liquid crystal projector, the reasons are as follows;

The number of pixels in a liquid crystal tends to increase in order to comply with the tendency for a finer image and to match up the number of pixels of a personal computer. Specifically each type of the VGA, SVGA and XGA uses 640×480 pixels, 800×600 pixels and 1024×768 pixels, respectively, with the XGA type now occupying the mainstream position among them. Such a trend to a larger number of pixels is expected to proceed further, and the SXGA (1080×1024 pixels) is expected to appear in the near future.

A single pixel consists significantly of an opening portion for transmitting a light beam therethrough and a transistor portion for driving the pixel, wherein the transistor portion does not allow any light beams to pass therethrough. The larger the number of pixels in a liquid crystal becomes, the smaller the area of a single pixel. However, there is a limit in decreasing the size of a transistor existing in the single pixel. Further, as the number of pixels is increased, there is increased the ratio of the area occupied by the transistor portion where light beams are not transmitted (referring to FIG. 1(a)–1(c)). Consequently, the ratio (an opening ratio) of light beams transmitted through the liquid decreases, and hence one is forced to use a means (such as a high output power) to radiate a stronger beam than that of a lamp in order to prevent the brightness in the liquid crystal from decreasing. As a result, there appears a thermal distribution in the PBS prism polarizing the P-wave and S-wave of the light beam, and thereby a thermal stress affects the inside of the glass.

In the case of a reflector type liquid crystal projector, the reasons are as follows:

FIG. 2 is a simplified structural view of the reflector type liquid crystal projector. Under its reflecting surface, the reflector type has a transistor to drive the liquid crystal, which is different from the constitution of the transmitter type. As a result the reflector type has the characteristic that the opening ratio never decreases even when the pixel used therein keeps up with the trend to a finer image. Thereby the reflector type has an advantage to comply with an increased number of pixels in future liquid crystal projectors. However, a fault of the reflector type is that the optical path length gets longer because a light beam goes and returns within a PBS prism 1 and a cross prism 2. When an optical path difference due to a birefringence is denoted by δ (nm), there exists the following relation.

$$\delta = B \times \sigma \times d$$

In the above equation, the symbol σ (10$^5$ Pa) represents an internal stress when a thermal action or dynamic force is applied, the symbol d (cm) designates an optical path length, and the symbol B denotes a stress-optical coefficient (10$^{-12}$ Pa). When the stress-optical coefficient B is constant and the internal stress σ or the optical path length d becomes larger, the birefringence gets larger. When the birefringence increases, the resolving power into P-polarized light and S-polarized light is resultingly disturbed. In particular, under the condition of an OFF state representing a black color as a pixel, a light beam which is expected to have been converted from P-polarized light to S-polarized light remains P-polarized light and thereby produces an unevenness of the black color on the screen (in the transmitter type, the internal stress σ and the optical path length d each becomes larger, which causes a problem).

Since a birefringence is presented by the product of the B, σ and d, it is possible to decrease a birefringence by counterbalancing the increment due to the σ or d, by the decrement of the B. Going to extremes, as long as the B is zero, the δ is zero even when the σ or d is large.

In Japanese Laid-Open Patent Publication No. Hei 9-48631, a low stress-optical coefficient glass of $B_2O_3$—$Al_2O_3$—PbO system is described. In the glass, the constituent PbO has the strongest effect to decrease an stress-optical coefficient among the addable constituents to the glass. Accordingly, it is possible to make the stress-optical coefficient close to zero by using a large quantity of PbO in the glass, even though the components $B_2O_3$ and $Al_2O_3$ each has the effect to increase the stress-optical coefficient. However, there is a demerit in that the transmittance around the wavelength of 400 nm is lowered when a large quantity of PbO is used.

In Japanese Laid-Open Patent Publication No. Hei 9-48633, a low stress-optical coefficient glass being fluorophosphate-based is described. The glass contains fluorine, which is accordingly volatilized in quantity during the time of dissolution. Consequently it is difficult to obtain such a glass which a high reproducibility concerning optical characteristics such as an stress-optical coefficient, dispersibility and the like. Also, striae within the glass are developed influentially to thereby reduce the yield of the good glass products. Hence, to contain the constituent of fluorine does not necessarily mean to lower an stress-optical coefficient, especially since the use of a large quantity of fluorine causes a bad homogeneity within the glass.

In Japanese Laid-Open Patent Publication No. Sho 50-71708, a phosphate optical glass of $P_2O_5$—PbO—$Nb_2O_5$ system is described. This glass is intended to obtain an optical glass, which gets little colored and has a high refractive index, and is never oriented to be used in an application for a low stress-optical coefficient glass. Consequently, in the most of the examples no less than 5 wt. % of $Nb_2O_5$ is contained therein and hence the stress-optical coefficients thereof are over $+0.8\times10^{-12}$ Pa. In each example using less than 5% of $Nb_2O_5$, since more than 50% of PbO is contained therein, the refractive index thereof becomes over 1.73, and an external transmittance is occasionally worsened because a large amount of PbO is used.

In Japanese Laid-Open Patent Publication No. Hei 2-188442, a phosphoric acid based optical glass of $P_2O_5$—$Al_2O_3$—$B_2O_3$—RO (Mg, Ca, Sr, Ba, Pb) system is described. This glass is intended to obtain an optical glass, which has a high light beam transmittance in the ultraviolet region, and is never oriented to be used in an application for a low stress-optical coefficient glass. Consequently, in the glass having more than 36% of $P_2O_5$, the stress-optical coefficient is more than $+0.8\times10^{-12}$ Pa because the sum of the constituents of BaO and PbO is less than 42%. When the constituent of $P_2O_5$ falls into the range of 32 to 36%, more than 4% of $Al_2O_3$ is contained therein and accordingly the liquid phase temperature becomes higher. As a result this is inappropriate for an actual manufacturing thereof.

Further, In JOURNAL OF THE SOCIETY OF GRASS TECHNOLOGY (1957, 359T–362T, "The effects of the Polarization of the Constituent Ion on the Photoelastic Birefringence of the Glass", BY MEGUMI TASHIRO), a binary glass of $P_2O_5$—PbO system is disclosed, and it is described that the stress-optical coefficient becomes zero when the composition consists of $P_2O_5$: 40.5 wt. % and PbO : 59.5 wt %. However, the glass of such a composition has a drawback that it is poor in the chemical durability, liable to cause yellowing due to moisture in air, and its practicability is low.

As mentioned above, there has not yet been obtained a low stress-optical coefficient glass which overcomes the above various problems and which has a stress-optical coefficient, a refractive index and the like which falls within a predetermined range, and which glass further has a low liquid phase temperature and the possibility of being mass-produced.

SUMMARY OF THE INVENTION

The present invention has been made in light of the above background, and an object thereof is to provide a light polarization control element which overcomes the above problems and has a stress-optical coefficient, a refractive index and the like which falls within a predetermined range and a low liquid phase temperature and which is able to be mass-produced. Further, the present invention is directed to a method of manufacturing the light polarization control element.

The constituents of PbO and BaO are indispensable in order to hold the stress-optical coefficient within a predetermined range.

When the content of PbO or BaO is decreased, the stress-optical coefficient is increased. If the content thereof is increased, then the stress-optical coefficient is decreased, but, it becomes bad in the devitrification.

There exists accordingly a preferable range of the above content.

In a phosphate glass containing the constituent of $P_2O_5$ as a indispensable constituent for forming the glass, the inventors have made repeated experiments in which any one or both of the constituents of PbO and BaO are blended with the constituent $P_2O_5$ in the predetermined ratios for obtaining a low stress-optical coefficient glass to satisfy the above object, and finally have found that the object can be attained in the specific ratio.

Also, if various metal oxides are added to the glass materials, it brings about such advantages that the liquid phase temperature becomes lower dissolubility is improved, and the refractive index and stress-optical coefficient are easily controlled.

When each of certain kinds of metal oxides is added in an appropriate amount to the glass materials, it improves the chemical durability and effectively serves as an achromatic ingredient and a clarifying ingredient.

Consequently, a light polarization control element of the present invention is realized by using the stress-optical coefficient glass having the following compositions.

(Constitution 1)

The constitution contains, without any optional additions, the constituents of $P_2O_5$, BaO and PbO as follows:

$P_2O_5$; 20–60 wt % and

BaO+PbO; 40–73 wt %.

The content of PbO can be reduced by using BaO contained in the constitution while the stress-optical coefficient remains lowered, and accordingly safety for the environment is raised. Further, it is possible to keep the stress-optical coefficient within $+0.8\times10^{-12}$ Pa to $-0.3\times10^{-12}$ Pa. Also, there is an advantage that the liquid phase temperature can be reduced by defining the total amount of BaO and PbO.

(Constitution 2)

This is a constitution according to constitution 1, wherein the content of BaO is changed to be 10 to 60 wt %.

This constitution employs BaO as a indispensable element by utilizing the fact that the intrinsic stress-optical coefficient of BaO is minus, and thereby makes it possible to produce a phosphoric acid based and low stress-optical coefficient glass.

(Constitution 3)

This is a constitution according to constitution 1, wherein each content of the constituents is defined as follows:

$P_2O_5$; 30–60 wt %,

BaO; 10–60 wt %,

PbO; less than 50 wt % and

BaO+PbO; 40–70 wt %.

This constitution defines the content of the PbO to be less than 50 wt % and thereby raises safety for the environment. There can be obtained a low stress-optical coefficient glass capable of being mass-producible wherein the stress-optical coefficient falls into the range of $+0.8\times10^{-12}$ to $-0.3\times10^{-12}$ Pa, the refractive index (nd) is 1.57 to 1.73, and the liquid phase temperature is low.

(Constitution 4)

This constitution is intended to alter the range of each constituent in constitution 3 to be more preferable to improve each characteristic, and the constitution is made as follows:

$P_2O_5$; 35–56 wt %,
BaO; 12–56 wt %,
PbO; less than 46 wt % and
BaO+PbO; 43–65 wt %.

The liquid phase temperature is preferably less than 900° C. and further preferably less than 880° C.

(Constitution 5)

This is a constitution according to constitution 1, wherein the constituent PbO is substantially removed to define the glass of $P_2O_5$—BaO system, and each constituent is contained as follows:

$P_2O_5$; 20–70 wt % and
BaO; 30–60 wt %.

(Constitution 6)

Similar to constitution 5, this is a constitution according to constitution 1, wherein the PbO is substantially removed to define the glass of $P_2O_5$—BaO system, and each constituent is contained as follows:

$P_2O_5$; 30–60 wt % and
BaO; 40–60 wt. %.

In accordance with constituents 5 and 6. each stress-optical coefficient can be set to be $+0.8 \times 10^{-12}$ to $-0.3 \times 10^{-12}$ Pa.

(Constitution 7)

This is a constitution according to constitution 1, wherein the following materials, expressed as percent by weight, are further contained as an optional addition:

$B_2O_3$; less than 4%, $Al_2O_3$; less than 3%. $Nb_2O_5$; less than 2%, $WO_3$; 0–6, MgO; 0–5%, CaO; 0–6%, SrO; 0–6, ZnO; 0–6%, $La_2O_3$; 0–3%, $TiO_2$; 0–5%, $Li_2O$; less than 1%, $Na_2O$; less than 3%. $K_2O$; 0–3% $Cs_2O$; 0–3%, $Li_2O+Na_2O$; less than 5%, $Na_2O+K_2O$; less than 3%, $Sb_2O_3$; less than 0.5%, $As_2O_3$; 0–2%, $SnO_2$; 0–2%, $Sb_2O_3+Bi_2O_3+Tl_2O_3$; less than 0.5%.

By adding these additions, one is able to control each characteristic of an stress-optical coefficient, a liquid phase temperature, a refractive index, a transmittance, stability, light resistance and chemical durability and attain the improvements thereof.

(Constitution 8)

This is a constitution according to constitution 1, wherein an stress-optical coefficient is set to fall into the range of $+0.8 \times 10^{-12}$ to $-0.3 \times 10^{-12}$ Pa (including zero, the same applies hereinafter).

By setting the stress-optical coefficient to be within $+0.8 \times 10^{-12}$ to $-0.3 \times 10^{-12}$ Pa, it can be used suitably for the substrate and prism body forming the polarizing beam splitter in the liquid crystal projector, for example.

(Constitution 9)

This is a constitution according to constitution 1, wherein a refractive index (nd) is controlled to be within the middle refractive index range of 1.57 to 1.73.

By setting a refractive index (nd) to be within the middle range of 1.57 to 1.73, it can be used suitably for the substrate and prism body forming the polarizing beam splitter in the liquid crystal projector.

(Constitution 10)

This is a constitution according to constitution 1, wherein an external transmittance in the wavelength of 400 nm is set to be more than 70% (10 mm in thickness).

By setting the external transmittance in the wavelength of 400 nm to be more than 70% (10 mm in thickness), it can be used suitably for the substrate and prism body forming the polarizing beam splitter in the liquid crystal projector.

(Constitution 11)

This is a constitution according to constitution 1, wherein there are contained the constituents as follows:

$P_2O_5$; 23–42 wt %,
PbO; 50–70 wt % and
$Nb_2O_5$; 0.5–5 wt % (as an optional addition)

By adding $Nb_2O_5$ to a $P_2O_5$—PbO system glass, the range for vitrification is enlarged, and the glass has excellent characteristic in that the stress-optical coefficient lies within $+1.0 \times 10^{-12}$ to $-1.5 \times 10^{-12}$ Pa, an external transmittance of the 10 mm-thick glass in the wavelength 400 nm is more than 73% and a water durability by the powdered method (DW) is less than 0.3 wt %.

(Constitution 12)

The constitution is to realize a preferable form of constitution 11, and contains the following:

$P_2O_5$; 25–40 wt %,
PbO; 52–71 wt % and
$Nb_2O_5$; 1–4 wt %.

(Constitution 13)

This constitution results from the phosphoric acid glass of constitution 11 and further contains, as an optional addition expressed as percent by weight, the following:

MgO; 0–10%, CaO; 0–10%, SrO; 0–10%, BaO; 0–15%, $B_2O_3$; 0–10%, ZnO; 0–8%, $Sb_2O_3$; 0–2%, $As_2O_3$; 0–2%, $SnO_2$; 0–2%.

By containing these additions, this constitution reduces the liquid phase temperature and controls easily the stress-optical coefficient. These additions are useful for an achromatic and clarifying ingredient.

(Constitution 14)

This constitution is obtained from the phosphoric acid glass of constitution 11 and further contains, being expressed as percent by weight, $TiO_2$; 0– 6%, $LiO_2$: 0–5%, $Na_2O$; 0–5%, $K_2O$; 0–5% and $As_2O_3$: 0–5%, as an optional addition.

By adding these optional additions, the stress-optical coefficient is easily controlled.

(Constitution 15)

This constitution is to designate a preferable form obtained by specifying the optional additions to be added to constitution 11 as follows:

ZnO; 0–8 wt %, $Al_2O_3$; 0–5 wt %, $La_2O_3$; 0–3 wt %, MgO, 0–10 wt %, CaO; 0–10 wt % and SrO; 0–10 wt %.

(Constitution 16)

Similar to constitution 15, this constitution is to show anther preferable form obtained by defining the optional additions to be added to constitution 11 as follows: ZnO; 0–8 wt % and BaO: 0–15 wt %.

(Constitution 17)

This is a constitution according to constitution 11, wherein a refractive index falls into the range of 1.69 to 1.84.

(Constitution 18)

This is a constitution according to constitution 11, wherein the stress-optical coefficient falls into the range of $+1.0 \times 10^{-12}$ to $-1.5 \times 10^{-12}$ Pa.

(Constitution 19)

This is a constitution according to constitution 11, wherein the external transmittance in the wavelength 400 nm (10 mm in thickness) is set to be more than 73 %.

Each glass according to constitutions 17 to 19 is suitable for the substrate and prism body forming the polarizing beam splitter in the liquid crystal projector.

(Constitution 20)

This constitution is directed to a method of manufacturing a low stress-optical coefficient glass for a light polarization control element, wherein an arbitrary intrinsic stress-optical coefficient is applied to each of the constituents forming an stress-optical coefficient glass. Subsequently, the constituents and the contents thereof are determined based upon these intrinsic stress-optical coefficients, and the stress-optical coefficient glass having a desired stress-optical coefficient is thus produced.

(Constitution 21)

This constitution is directed to a method of manufacturing a low stress-optical coefficient glass for a light polarization control element, wherein an intrinsic stress-optical coefficient (unit: $10^{-12}$ Pa/mol) per molecule of each of the constituents forming an stress-optical coefficient glass is defined respectively as follows: $P_2O_5$; 0.029, BaO; −0.021, PbO; −0.036, $B_2O_3$; 0.05, $Al_2O_3$; 0.01, $Nb_2O_5$; 0.11, $WO_3$: 0.05, MgO; 0.04, CaO; 0.016, SrO: 0.008, ZnO; 0.037, $La_2O_3$; −0.01, $TiO_2$, 0.03, $Li_2O$; 0.015, $Na_2O$; 0.025, $K_2O$; 0.03, $Cs_2O$; 0.03. $Sb_2O_3$; 0.04, $Bi_2O_3$; 0.05, $TeO_2$; 0.05, $PbF_2$; −0.03, $BaF_2$; −0.015, followed by calculating the total amount of (intrinsic stress-optical coefficient)×(molecular amount), and the constituents and the contents thereof are determined based upon the calculated value and then an stress-optical coefficient glass having a desired stress-optical coefficient is produced.

(Constitution 22)

In the method of manufacturing the stress-optical coefficient glass as defined in constitution 11, this constitution is intended to determine the constituents and the contents thereof so that the integrated amount obtained by multiplying each inherent stress-optical coefficient by the corresponding molecular amount may fall into the range of $+0.8 \times 10^{-12}$ to $-0.3 \times 10^{-12}$ Pa.

(Constitution 23)

This constitution is directed to a prism for the liquid crystal projector, which prism uses the light polarization control element according to constitutions 1 or 11, or the light polarization control element produced according to constitution 22.

(Constitution 24)

This constitution is related to the polarizing beam splitter which uses the light polarization control element according to constitutions 1 or 11, or the light polarization control element produced according to constitution 22.

(Constitution 25)

This constitution is oriented to the liquid crystal projector into which there are incorporated the light polarization control element according to constitutions 1 or 11, or the light polarization control element produced according to the constitution 22.

Next, the constitutions of the present invention are described in detail.

Each of constitutions 1 to 11 is to contain at least the constituents $P_2O_5$ and BaO.

The reasons for limiting the contents thereof are explained below.

The constituent $P_2O_5$ is essential as a constituent to form a phosphate glass, and when the content is lowered less than 20%, the glass becomes bad in devitrification, when it gets over 70%, the durability is deteriorated. Consequently, the content of $P_2O_5$ is restricted to the range of 20 to 70%.

In the $P_2O_5$—BaO system, the range of $P_2O_5$ is preferably 30 to 70% and further preferably 32 to 59%. In the $P_2O_5$—BaO—PbO system, the range of $P_2O_5$ is preferably 30 to 60% and further preferably 35 to 56%.

The constituent BaO is an effective constituent so as to control the stress-optical coefficient to be small because BaO has a minus stress-optical coefficient. A low stress-optical coefficient glass can be produced by using PbO contained therein because PbO has a minus stress-optical coefficient as well as BaO. When total amount of BaO and PbO is lowered to be less than 10%, the stress-optical coefficient exceeds $+0.8 \times 10^{-12}$ Pa. On the other hand, when the amount gets more than 73%, the liquid phase temperature is raised. Consequently, the total amount of BaO and PbO is limited to the range of 40 to 73%. As for the total amount of BaO and PbO, the preferable range is 42 to 70% and the further preferable range is 43 to 65%. In the above, if the constituent BaO exceeds 60%, it causes the deterioration in devitrification. In order to attain a desired refractive index and stress-optical coefficient, the content of BaO is preferably 10% or more. Consequently, the content of BaO is restricted to the range of 10 to 60%. In the $P_2O_5$—BaO system, the range of BaO is preferably 30 to 60% and further preferably 40 to 60%. In the $P_2O_5$—BaO—PbO system, the range of BaO is preferably 12 to 56%. When the constituent PbO is more than 50%, the refractive index becomes more than 1.73 occasionally. Hence, the content of PbO preferably falls into the range of 0 to less than 50% in order that the refractive index is set to be no more than 1.73. A preferable range of PbO is from 0 to less than 46%. As far as it is environmentally considered, it is preferable that the content of PbO is substantially zero.

If an optional addition of $B_2O_3$ is added to the glass of $P_2O_5$—BaO—PbO system or $P_2O_5$—BaO system, it brings about an advantage as to reduce the liquid phase temperature. However, when the content of $B_2O_3$ becomes 4% or more, the chemical durability of the glass is reduced occasionally or otherwise the stress-optical coefficient exceeds $+0.8 \times 10^{-12}$ Pa at times. Consequently, the content of $B_2O_3$ is preferably in the range of from 0 to 4%, and more preferably, from 0 to 2%.

If each of $Nb_2O_5$ and $WO_3$ is added to the glass of $P_2O_5$—BaO—PbO system or $P_2O_5$—BaO system in an appropriate amount, it presents such an advantage as to lower the liquid phase temperature. Further, it also brings about another advantage to raise the refractive index, as it is desired for glass having a refractive index of 1.65 to 1.73 to be produced according to the present invention. However, if the content of $Nb_2O_5$ is more than 2% and that of $WO_3$ exceeds 6%, the glass is colored deeply or otherwise the stress-optical coefficient exceeds $+0.8 \times 10^{-12}$ Pa. Therefore, each of the contents of $Nb_2O_5$ and $WO_3$ is limited to from 0 to less than 2%, and to from 0 to 6%, respectively. Preferably, the former is from 0 to less than 1.5%, and the latter is from 0 to less than 4%. By adding each of MgO, CaO and SrO in proper quantity, there is attained the effect to lower the liquid phase temperature, and it is possible to control the refractive index and the stress-optical coefficient. However, if the content of MgO exceeds 5%, that of CaO is over 6%, or that of SrO is more than 6%, the liquid phase temperature is raised or the stress-optical coefficient gets over $+0.8 \times 10^{-12}$ Pa. Hence, each of the contents of MgO. CaO and SrO is limited to the ranges of 0 to 5%, 0 to 6% and 0 to 6%, respectively. Preferably, each of the contents of MgO, CaO and SrO is 0 to 2%, 0 to 4% and 0 to 4%. respectively.

If $Li_2O$, $Na_2O$, $K_2O$ or $Cs_2O$ is added in appropriate quantity to the glass of the $P_2O_5$—BaO—PbO system or the $P_2O_5$—BaO system, it brings about such effects as to reduce the liquid phase temperature and improve the dissolubility. However, when the content of $Li_2O$ is more than 1% or any one of the contents of $Na_2O$, $K_2O$ and $Cs_2O$ is over 3%, the liquid phase temperature is raised or the stress-optical coefficient gets over $+0.8 \times 10^{-12}$ Pa. Consequently, the content of $Li_2O$ is restricted to 0 to less than 1% and each of the content of $Na_2O$, $K_2O$ and $Cs_2O$ is limited to 0 to 3%. When the total amount of $Li_2O$ and $Na_2O$ gets over 5% and that of $K_2O$ and $Cs_2O$ becomes more than 3%, the liquid phase temperature rises. Consequently, the total amount of $Li_2O$ and $Na_2O$ is limited to 0 to less than 5% and that of $K_2O$ and $Cs_2O$ is restricted to 0 to less than 3%.

If any one of the optional constituents of $TiO_2$, $Al_2O_3$, ZnO and $La_2O_3$ is added in an appropriate quantity, the chemical durability of the resulting glass is improved. When the content of $TiO_2$ is over 5%, that of $Al_2O_3$ is more than 3%, that of ZnO exceeds 6% or that of $La_2O_3$ is more than 3%, the stress-optical coefficient becomes more than $+0.8 \times 10^{-12}$ Pa. Each content of $TiO_2$, $Al_2O_3$, ZnO and $La_2O_3$ is thus limited to 0 to 5%, 0 to 3%, 0 to 6% and 0 to 3%, respectively.

The optional constituents of $Sb_2O_3$, $As_2O_3$ and $SnO_2$ are effective as achromatic and clarifying ingredients. However, if the amount of addition of $Sb_2O_3$ is more than 5% or that of any one of $As_2O_3$ and $SnO_2$ is more than 2%, the liquid phase temperature is increased. Consequently, each content of $Sb_2O_3$, $As_2O_3$ and $SnO_2$ is limited to 0 to 0.5%, 0 to 2% and 0 to 2%, respectively.

It is possible to add the materials of $SiO_2$, $Y_2O_3$, $Gd_2O_3$, $ZrO_2$, $Ta_2O_5$, $Bi_2O_3$, $TeO_2$, $GeO_2$, $In_2O_3$, $Rb_2O_3$ and $Tl_2O_3$, as long as any of the advantages of the present invention are not impaired.

Each of the light polarization control elements according to constitutions 11 to 19 has the characteristic that the constitution according to constitution 1 contains, in percent by weight, 23 to 42 wt % of $P_2O_5$, 50 to 73 wt % of PbO and 0.5 to 5 wt % of $Nb_2O_5$. The thus obtained glass has the refractive index of 1.69 to 1.84. Meanwhile, it is possible to control the stress-optical coefficient to be within $+1.0 \times 10^{-12}$ to $-1.5 \times 10^{-12}$ Pa, or further $+0.4 \times 10^{-12}$ to $-0.4 \times 10^{-12}$ Pa or still further $+0.2 \times 10^{-12}$ to $-0.2 \times 10^{-12}$ Pa.

The reasons for limiting the contents thereof are explained as follows.

The constituent $P_2O_5$ is essential as a constituent to form a phosphate glass, and when the content thereof is lowered less than 23 wt %, the glass becomes bad in devitrification, and when it gets over 42 wt %, the chemical durability is deteriorated. Consequently, the content of $P_2O_5$ is restricted to the range of 23 to 42 wt %. In the similar point of view, a preferable range of $P_2O_5$ is 25 to 40 wt %.

The constituent PbO is essential as a constituent to control the stress-optical coefficient to be within $+1.0 \times 10^{-12}$ to $-1.5 \times 10^{-12}$ Pa. When the content thereof is lowered less than 50 wt %, the stress-optical coefficient becomes over $+1.0 \times 10^{-12}$ Pa, and when it is more than 73 wt %, the resulting glass is turned bad in devitrification. Consequently, the content of PbO is restricted to the range of 50 to 73 wt %. In the similar point of view, a preferable range of PbO is 52 to 71 wt %.

If $Nb_2O_5$ is added in the ratio of 0.5 to 5 wt % to the glass of $P_2O_5$—PbO system, it brings about such advantages as to improve chemical durability and largely reduce the liquid phase temperature. When the constituent $Nb_2O_5$ is less than 0.5 wt %, the above advantage becomes lost. On the other hand, when the content of $Nb_2O_5$ is over 5 wt %, the coloring power is strong. Hence, the content of $Nb_2O_5$ is controlled to 0.5 to 5 wt %. As similarly viewed, a preferable range of $Nb_2O_5$ is 1 to 4 wt %.

By adding any of the optional additions of MgO, CaO, SrO, BaO, $B_2O_3$ and ZnO in an appropriate quantity to the glass of $P_2O_5$—BaO—$Nb_2O_5$ system according to the present invention, an advantage of reducing the liquid phase temperature is obtained, and a control of the stress-optical coefficient is enabled. However, if the content of MgO is over 10 wt %, if the content of CaO is over 10 wt %, if the content of SrO is over 10 wt %, if the content of BaO is over 15 wt %, if the content of $B_2O_3$ is over 10 wt % or if the content of ZnO is over 8 wt %, then the devitrification resistance is deteriorated. Consequently, each of the contents of MgO, CaO, SrO, BaO, $B_2O_3$ and ZnO is limited to 0 to 10 wt %, 0 to 10 wt %, 0 to 10 wt %, 0 to 15 wt %, 0 to 10 wt %, and 0 to 8 wt %, respectively. Preferably, each content is 0 to 8 wt %, 0 to 8 wt %, 0 to 8 wt %, 0 to 12 wt %, 0 to 8 wt %, and 0 to 6 wt %, respectively.

Optional constituents of $Sb_2O_3$, $As_2O_3$ and $SnO_2$ are effective as a achromatic and clarifying ingredient. However, if each constituent is added in the ratio of more than 2 wt %, the devitrification resistance gets worst. Then, the contents of $Sb_2O_3$, $As_2O_3$ and $SnO_2$ each is restricted to 0 to 2 wt %.

By adding each optional constituent of $TiO_2$, $Li_2O$, $Na_2O$, $K_2O$ and $Al_2O_3$ in an appropriate quantity, the stress-optical coefficient can be controlled. However, if the content of $TiO_2$ is over 6 wt %, if the content of $Li_2O$ is over 5 wt %, if the content of $Na_2O$ is over 5 wt %, if the content of $K_2O$ is over 5 wt %, or if the content of $Al_2O_3$ is over 5 wt %, then the devitrification resistance becomes worse. Consequently, each of the contents of $TiO_2$, $Li_2O$, $Na_2O$, $K_2O$ and $Al_2O_3$ is restricted to 0 to 6 wt %, 0 to 5 wt %, 0 to 5 wt %, 0 to 5 wt % and 0 to 5 wt %, respectively. Preferably, each is 0 to 4 wt %, 0 to 4 wt %, 0 to 4 wt %, 0 to 4 wt % and 0 to 4 wt %, respectively.

It is possible to add other constituents of $SiO_2$, $Cs_2O$, $La_2O_3$, $Y_2O_3$, $Gd_2O_3$, $WO_3$, $ZrO_2$, $Ta_2O_5$, $Bi_2O_3$, $TeO_2$ and $GeO_2$, as long as the characteristics of the present invention do not get lost. Now, as a low stress-optical coefficient glass being good in the weather resistance and devitrification resistance, a phosphoric acid glass comprising 23 to 42 percent by weight of $P_2O_5$, 50 to 73 percent by weight of PbO, 0 to 15 percent by weight of BaO, 0 to 5 percent by weight of $Al_2O_3$, 0.5 to 5 percent by weight of $Nb_2O_5O$, 0 to 8 percent by weight of ZnO, 0 to 3 percent by weight of $La_2O_3$, 0 to 10 percent by weight of MgO, 0 to 10 percent by weight of CaO and 0 to 10 percent by weight of SrO are components to improve climate resistance or anticrystallization. Further, 0.5 to 5 percent by weight of $Nb_2O_5$ and 0 to 8 percent by weight of ZnO are preferred.

A low stress-optical coefficient glass with the above composition has a water durability by the powdered method of less than 0.3 wt % and an excellent chemical durability.

In manufacturing a low stress-optical coefficient glass of the present invention, it is desired to employ, as a material of $P_2O_5$, phosphoric acid ($H_3PO_4$), metaphosphoric acid, diphosphorus pentaoxide and the like, and further use, as the other materials, carbonate, nitrate, oxide, fluoride and so on as necessary.

Referring now to a method of manufacturing a light polarization control element of the present invention, each of the above materials is weighted in prescribed proportion, blended together for a prepared material. The obtained material is put into a melting furnance heated up to 900 to 1200° C., in which dissolving, clarifying and mixing thereof are sequentially conducted for homogenization. As a next step for treating the resulting homogeneous material, there are the following processes and so on: the resulting homogeneous material is inpoured into a mold and cooled gradually, and an thus obtained glass body is cut into any desired shape. Otherwise the above resulting uniform material may be inpoured into a mold with any target shape previously prepared. As a shape of the prism, there is employed a square pillar or the like having the side surface of a triangle or trapezoid.

Next, constitutions 20 to 25 are explained.

These constitutions of the present inventions have the characteristic, wherein an arbitrary inherent stress-optical coefficient is applied to each of the constituents forming a stress-optical coefficient glass. Subsequently, the constituents and the contents thereof are determined based upon these inherent stress-optical coefficients, and a stress-optical coefficient glass having a desired stress-optical coefficient is thus produced.

Specifically, the inherent stress-optical coefficient (unit: $10^{-12}$ Pa/mol) per molecule of each of the constituents forming the stress-optical coefficient glass is defined respectively, for example, as follows: $P_2O_5$; 0.029, BaO; −0.021, PbO; −0.036, $B_2O_3$; 0.05, $Al_2O_3$; 0.01, $Nb_2O_5$; 0.11, $WO_3$; 0.05, MgO ; 0.04, CaO; 0.016, SrO: 0.008, ZnO; 0.037, $La_2O_3$; −0.01, $TiO_2$; 0.03. $Li_2O$; 0.015, $Na_2O$; 0.025, $K_2O$; 0.03, $Cs_2O$: 0.03, $Sb_2O_3$; 0.04, $Bi_2O_3$; 0.05, $TeO_2$; 0.05, $PbF_2$; −0.03. $BaF_2$; −0.015, followed by calculating the total amount of (inherent stress-optical coefficient)× (molecular amount), and the constituents and the contents thereof are determined based upon the calculated value and then a stress-optical coefficient glass having a desired stress-optical coefficient is produced. In this case, the constituents and the contents thereof can be determined by considering the refractive index, transmittance, liquid phase temperature, dissolubility, chemical durability and coloring and the like, in addition to the stress-optical coefficient.

For reference, the inherent stress-optical coefficient (unit: $10^{-12}$ Pa/mol) per molecule of each the constituents forming an stress-optical coefficient glass is not limited to the above values, for example, the followings are available:

$P_2O_5$; 0.029=0.01, BaO; −0.021±0.01, PbO: −0.036±0.01, $B_2O_3$; 0.05±0.01, $Al_2O_3$; 0.01±0.01, $Nb_2O_5$; 0.11±0.01, $WO_3$; 0.05±0.01, MgO; 0.04±0.01, CaO; 0.016±0.01, SrO; 0.008±0.01, ZnO; 0.037±0.01, $La_2O_3$; −0.01±0.01, $TiO_2$; 0.03±0.01, $Li_2O$, 0.015±0.01, $Na_2O$; 0.025±0.01, $K_2O$; 0.03±0.01, $Cs_2O$; 0.03±0.01, $Sb_2O_3$; 0.04±0.01, $Bi_2O_3$; 0.05±0.01, $TeO_2$; 0.05±0.01, $PbF_2$; −0.03±0.01, $BaF_2$, −0.015±0.01. The constituents and the contents thereof are determined based upon these inherent stress-optical coefficients values and then a stress-optical coefficient glass having a desired stress-optical coefficient is produced.

Further, even when any constituents other than the above constituents are added, each inherent stress-optical coefficient of the constituents can be easily obtained by using these actual measurements.

The light polarization control element of the present invention may be used as a spatial optical modulating element to conduct a modulation of polarized light, a substrate and prism body forming a polarizing beam splitter, a glass substrate for electron optics, glass parts for electron optics, etc. In particular, it is suitable for use within any instruments being subjected to a high temperature such as a projector type color display unit (a liquid crystal projector and the like).

A system for a liquid crystal projector of the present invention contains an LCD panel, a polarizing prism, a projection lens, a light source and the like, and the characteristic thereof is to incorporate any of light polarization control elements therein as the above polarizing prism. The system formation, except the polarizing prism, is not necessarily limited, and either a reflector type or transmitter type is available, the formation of the former is shown in FIG. 2.

BRIEF DESCRIPTION OF THE DRAWINGS

FIGS. 3 to 5 are tables showing embodiments and comparative examples with regard to a $P_2O_5$—BaO binary system glass and a $P_2O_5$—BaO—PbO trinary system glass.

FIGS. 6 and 7 are tables wherein the contents of each composition in embodiments 1 to 17 in FIGS. 3 and 4 are converted and represented in molecular percents.

FIGS. 8 to 11 are tables showing embodiments and comparative examples with regard to a $P_2O_5$—BaO binary system glass.

FIGS. 12 and 13 are tables wherein the contents of each composition in embodiments 31 to 54 in FIGS. 10 and 11 are converted and represented in molecular percents.

DETAILED DESCRIPTION OF THE PREFERRED EMBODIMENTS

Figure 1A:
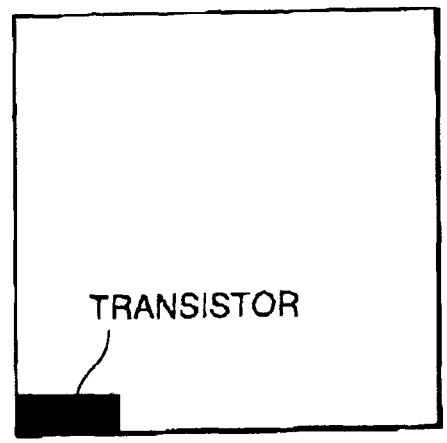
FIG. 1(a), FIG. 1(b), and FIG. 1(c) are plan views illustrating the relation between number of pixels and an opening ratio.
Figure 1B:
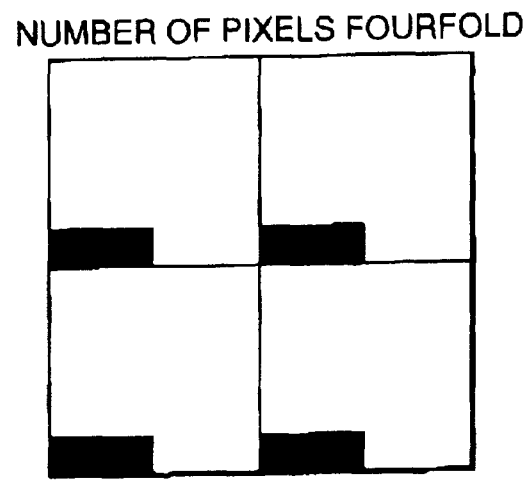
Figure 1C:
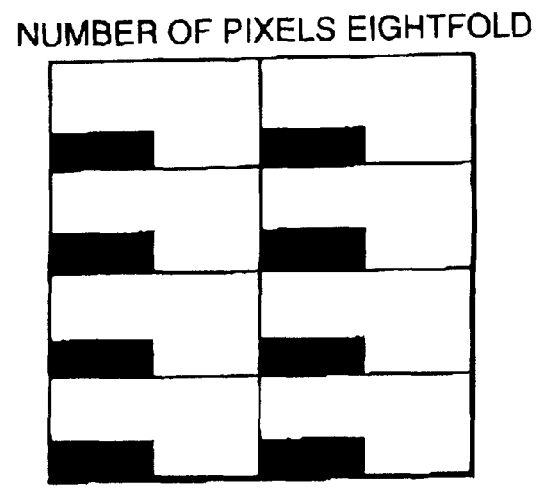
Figure 2:
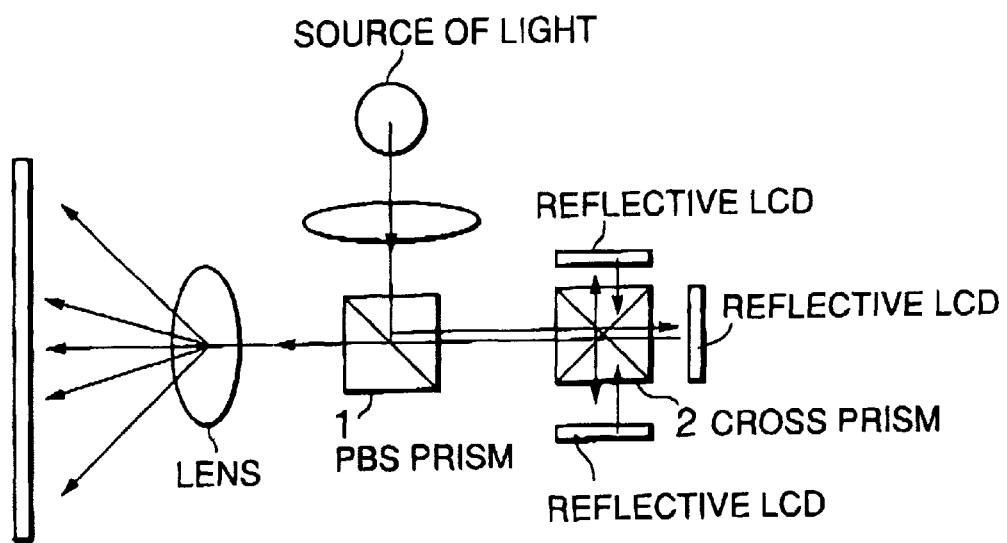
FIG. 2 is a plan view illustrating a schematic formation of a reflector type liquid crystal projector.

The present invention is described based upon the embodiments discussed in detail below.

First, the embodiments concerning a $P_2O_5$—BaO binary system glass and $P_2O_5$—BaO—PbO trinary system glass are explained.

Embodiments 1 to 17 and Comparative Examples 1 to 5

A low stress-optical coefficient glass is conventionally produced according to the prepared compositions (wt %) shown in FIGS. 3 to 5.

With respect to the material for preparation, as a material for $P_2O_5$, there are employed phosphoric acid ($H_3PO_4$), metaphosphoric acid, diphosphorus pentaoxide and the like, and as a material for the other, there are appropriately used carbonate, nitrate, oxide, fluoride and so on. Each of the above materials is weighted in the prescribed proportion, blended together for a prepared material, which is then put into a melting furnance heated up to 900 to 1200° C., and in which dissolving, clarifying and mixing thereof are sequentially conducted for homogenization. The resulting homogeneous material is inpoured into a mold and cooled gradually. There are thus obtained the low stress-optical coefficient glasses in embodiments 1 to 17 and comparative examples 1 to 5.

As for the above low stress-optical coefficient glasses, a refractive index (nd), a low stress-optical coefficient and a liquid phase temperature are measured. Each result of embodiments 1 to 9, embodiments 10 to 17 and comparative examples 1 to 5 is shown in FIG. 3, FIG. 4 and FIG. 5, respectively.

The "stress-optical coefficient" is obtained by measuring, upon employment of a He—Ne laser beam, the optical path difference, which is to appear in the center of the glass when a surface-polished glass having the size of 20 mmø in diameter by 15.8 mm in height is subjected to a straight compressive load.

The "L.T (a liquid phase temperature)" represents, when a plurality of glasses are left within a furnance having a temperature gradient of 700 to 1100° C. for thirty minutes and thereafter it is observed with a microscope whether there is any crystallization in each softened glass or not, the lowest temperature of the temperatures at which the glasses in which any crystallization is not found were laid in the furnance. The "L.T not recognized" means that there is no crystallization in the entire range of temperature.

Appreciation

The low stress-optical coefficient glasses according to embodiments 1 to 17 have stress-optical coefficients within $-0.3 \times 10^{-12}$ to $+0.8 \times 10^{-}$Pa in the middle refractive index (nd) of 1.57 to 1.73 and have low liquid temperatures.

Comparative examples 1 and 2 show the glasses described in embodiments 20 and 26 in the above Japanese Laid-Open Patent Publication No. Hei 2-188442. The total amount of BaO and PbO in comparative example 1 is less than 45 wt %, and hence the stress-optical coefficient is over $+0.8 \times 10^{-12}$Pa. In comparative example 2, the constituent $Al_2O_3$ is contained in a ratio of over 3%, and accordingly the liquid phase temperature is high.

Comparative examples 3 and 4 show the glasses described in No.2 of table 3 and No. 21 of table 1 in the embodiments in the above Japanese Laid-Open Patent Publication No. Sho 50-71708. In comparative example 3, the constituent PbO is contained in a ratio of more than 50%, and hence the refractive index is over 1.73. In comparative example 4, the constituent $Nb_2O_5$ is contained in a ratio of more than 2%, and hence the stress-optical coefficient becomes over $+0.8 \times 10^{-12}$ Pa. In comparative example 5, the constituent F is contained in a large quantity, and hence the stress-optical coefficient becomes over $+0.8 \times 10^{-12}$ Pa, and also the liquid phase temperature is high.

Further, at the outcome of measuring the transmittances, the low stress-optical coefficient glasses in embodiments 1 to 17 have the high transmittances of 70 to 90% around 400 nm (10 mm in thickness), while the glasses in the comparative examples 3 and 4 show the low transmittances of less than 70% around 400 nm.

Embodiment 18

FIG. 6 and FIG. 7 shows that the contents of each composition in embodiments 1 to 17 are converted into and represented in molecular percents. In FIG. 6 and FIG. 7, the "stress-optical coefficient: actual measured value" indicates the actual measured values of stress-optical coefficient in the embodiments in FIG. 3 and FIG. 4. The "stress-optical coefficient: calculated value" represents the values which are obtained by applying "intrinsic stress-optical coefficient value" in FIG. 6 and FIG. 7 to the corresponding constituent and calculating, using these intrinsic stress-optical coefficient values, the integrated amount resulting from each intrinsic stress-optical coefficient being multiplied by the corresponding molecular amount.

Referring to how to calculate the "intrinsic stress-optical coefficient", arbitrary values are applied successively, as a molecular intrinsic stress-optical coefficient, to each constituent of certain existing substances whose compositions (about 100 kinds thereof) and stress-optical coefficients are known. As a result, an intrinsic stress-optical coefficient is defined as the value which is applied to the calculated amount which is the closest to the actual measured value. In each case, there is obtained a calculated amount which is closest to the actual measured value.

Embodiment 19

A substrate and prism body forming a polarizing beam splitter in a liquid crystal projector are prepared by using the low stress-optical coefficient glasses in embodiments 1 to 17, and the liquid crystal projector into which they are incorporated is obtained. When the liquid crystal projector is used, the temperature of the heating side of the prism body is 150° C. and that of the cooling side thereof is 50° C. Although there appears a temperature difference of 100° C., any influences due to the stress-optical property is not recognized.

Next, the embodiments regarding the binary glass of $P_2O_5$—PbO system are explained.

A low stress-optical coefficient glass is conventionally produced according to the prepared compositions (wt %) shown in FIGS. 8 to 11.

With respect to the material for preparation, as a material for $P_2O_5$, there are employed phosphoric acid ($H_3PO_4$), metaphosphoric acid, diphosphorus pentaoxide and the like, and as a material for the other, there are appropriately used carbonate, nitrate, oxide, fluoride and so on. Each of the above materials is weighted in prescribed proportion, and blended together for a prepared material. The obtained material is put into a melting furnace heated up to 900 to 1200° C., in which dissolving, clarifying and mixing thereof are sequentially conducted for homogenization. The resulting homogeneous material is inpoured into a mold and cooled gradually, and there are thus obtained the low stress-optical coefficient glasses in embodiments 20 to 54 and comparative examples 6 to 14.

With respect to the above low stress-optical coefficient glasses, the characteristics appreciation is conducted as shown in FIG. 8 to FIG. 11.

The "DW" in the tables represents the decreased mass (%) of powered glass when a powered glass (granularity: 420 to 590 $\mu$m) having a mass corresponding to the specific gravity of the glass is contained in a platinous basket, which basket is immersed in a round bottom flask of fused quarts containing 80 ml of pure water (pH=6.5 to 7.5) and is treated in the boiling water for 60 minutes.

The "T 400 nm" denotes an external transmittance of a glass where both surfaces are polished up to 10 mm in thickness in the wavelength of 400 nm.

The "stress-optical coefficient" is obtained by measuring, upon employment of a He—Ne laser beam, the optical path difference, which is to appear in the center of the glass when a surface-polished glass having the size of 20 mmø in diameter by 15.8 mm in height is subjected to a straight compressive load.

The "L.T (a liquid phase temperature)" represents, when a plurality of glasses are left within a furnance having a temperature gradient of 700 to 1100° C. for thirty minutes and thereafter it is observed with a microscope whether there is any crystallization in each softened glass or not, the lowest temperature of the temperatures at which the glasses in which any crystallization is not found were laid in the furnance.

Apppreciation

Comparative example 6 relates to the binary system glass of $P_2O_5$—PbO referred to above as prior art, where the glass has a poor water resistance of 4 wt % because it never contains $Nb_2O_5$.

Comparative example 7, as well as comparative example 6, relates to the binary system glass of $P_2O_5$—PbO, where the glass is devitrified while dissolving because it never contains $Nb_2O_5$.

Comparative examples 8 and 9 relate to the glass of the $SiO_2$—PbO—alkali oxide system referred to above as prior art. Comparative example 8, containing a larger amount of PbO, is poor in transmittance, while comparative example 9, containing a smaller amount of PbO, has a larger stress-optical coefficient.

Comparative example 10 relates to a borosilicate glass (BK7) described above as a prior art in which the stress-optical coefficient becomes large.

Meanwhile, because the constituent $Nb_2O_5$ is added to the $P_2O_5$—PbO system glass, the low stress-optical coefficient glasses in embodiments 20 to 54 have excellent characteristics such that the range for vitrification is enlarged, the stress-optical coefficient is between $+1.0\times10^{-12}$ to $-1.5\times10^{-12}$Pa, the external transmittance of a 10 mm-thick glass in 400 nm is over 73% and the water resistance (DW) of powder is less than 0.3 %.

Compositions of the comparative examples 11 to 14 are out of the range of the composition of the present invention, and hence these examples are inferior to the present invention.

FIG. 12 and FIG. 13 show that the contents of each composition in embodiments 31 to 54 are converted into molecular percents and represented therein. In FIG. 12 and FIG. 13, the "stress-optical coefficient 1" denotes the actual measured values of stress-optical coefficient in embodiments in FIG. 10 and FIG. 11. The "stress-optical coefficient 2" is obtained by applying the "molecular intrinsic stress-optical coefficient value" shown in FIG. 12 and FIG. 13 to the corresponding constituent and calculating, using these intrinsic stress-optical coefficient values, the integrated amount resulted from each intrinsic stress-optical coefficient being multiplied by the corresponding molecular amount.

As mentioned above, while the present invention is described referring to the preferred embodiments, the present invention is not intended to be limited to the above embodiments.

For example, it is enabling to add any constituents other than the constituents shown in the embodiments, as long as the characteristics of the present invention are not lost.

What is claimed is:

1. A light polarization control element using a stress-optical coefficient glass, the stress-optical coefficient glass comprising a phosphoric acid glass, the phosphoric acid glass comprising 20 to 60 percent by weight of $P_2O_5$ and 40 to 73 percent by weight of a combined amount of BaO and PbO.

2. A light polarization control element according to claim 1, wherein the phosphoric acid glass includes 10 to 60 percent by weight of BaO in the 40 to 73 percent by weight of the combined amount of BaO and PbO.

3. A light polarization control element using a stress-optical coefficient glass the stress-optical coefficient glass, comprising a phosphoric acid glass, the phosphoric acid glass includes 30 to 60 percent by weight of $P_2O_5$, 12 to 56 percent by weight of BaO and 0 to less than 50 weight of PbO, wherein the combined amount of BaO and PbO is 40 to 70 percent by weight and wherein said phosphoric acid glass has a stress-optical coefficient in the range of $+0.8\times10^{-12}$Pa to $-0.3\times10^{-12}$Pa.

4. A light polarization control element using a stress-optical coefficient glass, the stress-optical coefficient glass comprising a phosphoric acid glass, the phosphoric acid glass includes 30 to 56 percent by weight of $P_2O_5$, 12 to 56 percent by weight of BaO and less than 46 percent by weight of PbO, wherein the combined amount of BaO and PbO is 43 to 65 percent by weight and wherein said phosphoric acid glass has a stress-optical coefficient in the range of $+0.8\times10^{-12}$Pa to $-0.3\times10^{-12}$Pa.

5. A light polarization control element using a stress-optical coefficient glass, the stress optical coefficient glass comprising a phosphoric acid glass, the phosphoric acid glass comprising 20 to 70 percent by weight of $P_2O_5$, and 40 to 60 percent by weight of BaO, wherein said phosphoric acid glass has a stress-optical coefficient in the range of $+0.8\times10^{-12}$Pa to $-0.3\times10^{-12}$Pa.

6. A light polarization control element using a stress-optical coefficient glass, the stress-optical coefficient glass comprising a phosphoric acid glass, the phosphoric acid glass comprising 20 to 70 percent by weight of $P_2O_5$, 40 to 60 percent by weight of BaO and 0 to less than 40 percent by weight of PbO, wherein said phosphoric acid glass has a stress-optical coefficient in the range of $+0.8\times10^{-12}$Pa to $-0.3\times10^{-12}$Pa.

7. A light polarization control element according to claim 3, wherein the phosphoric acid glass further includes less than 4 percent by weight of $B_2O_3$, less than 3 percent by weight of $Al_2O_3$, less than 2 percent by weight of $Nb_2O_5$, 0 to 6 percent by $WO_3$, 0 to 5 percent by weight of MgO, 0 to 6 percent by weight of CaO, 0 to 6 percent by weight of SrO, 0 to 6 percent by weight of ZnO, 0 to 3 percent by weight of $La_2O_3$, 0 to 5 percent by of $TiO_2$, less than 1 percent by weight of $Li_2O$, less than 3 percent by weight of $Na_2O$, 0 to 3 percent by weight of $K_2O$, and less than 3 percent by weight of $Cs_2O$, less than 5 percent by weight of $Li_2O$ and $Na_2O$, less than 3 percent by weight of $K_2O$, and $Na_2O$, less than 0. 5 percent by weight of $Sb_2O_3$, 0 to 2 percent by weight of $As_2O_3$, 0 to 2 percent by weight of $SnO_2$, and less than 0.5 percent by weight of $Sb_2O_3$, $Bi_2O_3$ and $Tl_2O_3$.

8. A light polarization control element according to claim 1, wherein the phosphoric acid glass has a stress-optical coefficient in the range of $+0.8\times10^{-12}$ Pa to $-0.3\times10^{-12}$ Pa.

9. A light polarization control element according to claim 1, wherein the phosphoric acid glass has a refractive index (nd) in the range of 1.57 to 1.73.

10. A light polarization control element according to claim 1, wherein the phosphoric acid glass has an external transmittance of more than 70% at a wavelength of 400 mm and for glass having a thickness of 10 mm.

11. A light polarization control element using a stress-optical coefficient glass, the stress-optical coefficient glass comprising a phosphoric acid glass, the phosphoric acid glass includes 23 to 42 percent by weight of $P_2O_5$, 50 to 73 percent by weight of PbO and 0.5 to 5 percent by weight of $Nb_2O$.

12. A light polarization control element according to claim 11, wherein the phosphoric acid glass includes 25 to 40 percent by weight of $P_2O_5$, 52 to 71 percent by weight of PbO and 1 to 4 percent by weight of $Nb_2O_5$.

13. A light polarization control element according to claim 11, wherein the phosphoric acid glass further includes 0 to 10 percent by weight of MgO, 0 to 10 percent by weight of CaO, 0 to 10 percent by weight of SrO, 0 to 15 percent by weight of BaO, 0 to 10 percent by weight of $B_2O_3$, 0 to 8 percent by weight of ZnO, 0 to 2 percent by weight of $Sb_2O_3$, 0 to 2 percent by weight of $As_2O_3$ and 0 to 2 percent by weight of $SnO_2$.

14. A light polarization control element according to claim 11, wherein the phosphoric acid glass further includes 0 to 6 percent by weight of $TiO_2$, 0 to 5 percent by weight of $Li_2O$, 0 to 5 percent by weight of $Na_2O$, 0 to 5 percent by weight of $K_2O$ and 0 to 5 percent by weight of $Al_2O_3$.

15. A light polarization control element according to claim 11, wherein the phosphoric acid glass further includes 0 to 15 percent by weight of BaO, 0 to 8 percent by weight of ZnO, 0 to 5 percent by weight of $Al_2O_3$, 0 to 3 percent by weight of $La_2O_3$, 0 to 10 percent by weight of MgO, 0 to 10 percent by weight of CaO and 0 to 10 percent by weight of SrO.

16. A light polarization control element according to claim 11, wherein the phosphoric acid glass further includes 0 to 15 percent by weight of BaO, and 0 to 8 percent by weight of ZnO.

17. A light polarization control element according to claim 11, wherein the phosphoric acid glass has a refractive index (nd) in the range of 1.69 to 1.84.

18. A light polarization control element according to claim 11, wherein the phosphoric acid glass has a stress-optical coefficient in the range of $+1.0 \times 10^{-12}$ Pa to $-1.5 \times 10^{-12}$ Pa.

19. A light polarization control element according to claim 11, wherein the phosphoric acid glass has an external transmittance of more than 70% at a wavelength of 400 nm and for a glass having a thickness of 10 mm.

20. A light polarization control element according to claim 1, wherein said element is a prism in a liquid crystal projector.

21. A light polarization control element according to claim 1, wherein said element is a polarizing beam splitter.

22. A liquid crystal projector system into which a light polarization control element according to claim 1 is incorporated.

23. A light polarization control element according to claim 11, wherein said element is a prism in a liquid crystal projector.

24. A light polarization control element according to claim 11, wherein said element is a polarizing beam splitter.

25. A liquid crystal projector system into which a light polarization control element according to claim 11 is incorporated.

26. A light polarization control element according to claim 4, wherein the phosphoric acid glass further includes less than 4 percent by weight of $B_2O_3$, less than 3 percent by weight of $Al_2O_3$, less than 2 percent by weight of $Nb_2O_5$, 0 to 6 percent by weight of $WO_3$, 0 to 5 percent by weight of MgO, 0 to 6 percent by weight of CaO, 0 to 6 percent by weight of SrO, 0 to 6 percent by weight of ZnO, 0 to 3 percent by weight of $La_2O_3$, 0 to 5 percent by weight of $TiO_2$, less than 1 percent by weight of $Li_2O$, less than 3 percent by weight of $Na_2O$, less than 3 percent by weight of $K_2O$, 0 to 3 percent by weight of $Cs_2O$, less than 5 percent by weight of $Li_2O$ and $Na_2O$, less than 3 percent by weight $K_2O$, and $Na_2O$ less than 0.5 percent by weight of $Sb_2O_3$, 0 to 2 percent by weight of $As_2O_3$, 0 to 2 percent by weight of $SnO_2$, and less than 0.5 percent by weight of $Sb_2O_3$, $Bi_2O_3$ and $Tl_2O_3$.

27. A light polarization control element according to claim 6, wherein the phosphoric acid glass further includes less than 4 percent by weight of $B_2O_3$, less than 3 percent by weight of $Al_2O_3$, less than 2 percent by weight of $Nb_2O_5$, 0 to 6 percent by weight of $WO_3$, 0 to 5 percent by weight of MgO, 0 to 6 percent by weight of CaO, 0 to 6 percent by weight of SrO, 0 to 6 percent by weight of ZnO, 0 to 3 percent by weight of $La_2O_3$, 0 to 5 percent by weight of $TiO_2$, less than 1 per weight of $Li_2O$, less than 3 percent by weight of $Na_2O$, 0 to 3 percent by weight of $K_2O$, 0 to 3 percent by weight of $Cs_2O$, less than 5 percent by weight of $Li_2O$ and $Na_2O$, less than 3 percent by weight $K_2O$ and $Na_2O$, less than 0.5 percent by weight of $Sb_2O_3$, 0 to 2 percent by weight of $As_2O_3$, 0 to 2 percent by weight of $SnO_2$, and less than 0.5 percent by weight of $Sb_2O_3$, $Bi_2O_3$ and $Tl_2O_3$.

28. A liquid crystal display projector system into which a light polarization control element according to claim 3 is incorporated.

29. A liquid crystal display projector system into which a light polarization control element according to claim 4 is incorporated.

30. A liquid crystal display projector system into which a light polarization control element according to claim 5 is incorporated.

31. A liquid crystal display projector system into which a light polarization control element according to claim 6 is incorporated.

* * * * *